(12) United States Patent
Deperraz et al.

(10) Patent No.: US 9,080,682 B2
(45) Date of Patent: Jul. 14, 2015

(54) SHAPE MEMORY ALLOY ACTUATED PILOT CONTROLLED LATCHING VALVE

(75) Inventors: Nicolas Deperraz, Bons en Chablais (FR); Stephane Hager, Coppet (CH)

(73) Assignee: Fluid Automation Systems S.A., Versoix (CH)

( * ) Notice: Subject to any disclaimer, the term of this patent is extended or adjusted under 35 U.S.C. 154(b) by 0 days.

(21) Appl. No.: 14/126,815

(22) PCT Filed: Jul. 5, 2012

(86) PCT No.: PCT/EP2012/002820
§ 371 (c)(1),
(2), (4) Date: Dec. 16, 2013

(87) PCT Pub. No.: WO2013/004380
PCT Pub. Date: Jan. 10, 2013

(65) Prior Publication Data
US 2014/0117262 A1    May 1, 2014

(30) Foreign Application Priority Data
Jul. 7, 2011    (FR) ...................................... 11 56149

(51) Int. Cl.
| | | |
|---|---|---|
| F16K 31/00 | (2006.01) | |
| F16K 31/18 | (2006.01) | |
| F16K 31/02 | (2006.01) | |
| F16K 31/128 | (2006.01) | |
| F16K 31/42 | (2006.01) | |
| F16K 31/56 | (2006.01) | |

(52) U.S. Cl.
CPC ............. *F16K 31/002* (2013.01); *F16K 31/003* (2013.01); *F16K 31/02* (2013.01); *F16K 31/025* (2013.01); *F16K 31/128* (2013.01); *F16K 31/42* (2013.01); *F16K 31/56* (2013.01)

(58) Field of Classification Search
CPC ..... F16K 31/002; F16K 31/003; F16K 31/02; F16K 31/56
USPC .......................... 251/11, 30.01, 30.02, 30.61; 137/596.17, 596.1, 596.2, 613, 614
See application file for complete search history.

(56) References Cited

U.S. PATENT DOCUMENTS

| | | |
|---|---|---|
| 3,845,931 A | 11/1974 | Pimentel |
| 6,302,495 B1 | 10/2001 | Peltz |
| 2003/0234051 A1 | 12/2003 | Toivonen |
| 2006/0043683 A1 | 3/2006 | Ocalan |
| 2010/0012871 A1 | 1/2010 | Farrell |

FOREIGN PATENT DOCUMENTS

EP    2239486 A1    10/2010

*Primary Examiner* — John K Fristoe, Jr.
*Assistant Examiner* — Kelsey Rohman
(74) *Attorney, Agent, or Firm* — The Ollila Law Group LLC

(57) ABSTRACT

A latching valve is provided. The latching valve comprises a valve seal movable between first and second positions to selectively open a fluid communication path between fluid inlet and outlet ports. The latching valve also includes a first pilot valve seal movable between first and second positions. The first pilot valve seal selectively provides a pressurized fluid to a pilot control chamber, wherein pressurized fluid within the pilot control chamber biases the valve seal towards the first position. The latching valve also includes a second pilot valve seal movable between a first position and a second position. The second pilot valve seal selectively exhausts the pressurized fluid in the pilot control chamber. The latching valve also includes one or more shape memory alloy elements to actuate one or more of the first and second pilot valve seals between the first and second positions upon heating above a transformation temperature.

13 Claims, 3 Drawing Sheets

SHAPE MEMORY ALLOY ACTUATED PILOT CONTROLLED LATCHING VALVE

CROSS-REFERENCE TO RELATED APPLICATIONS

This is a National Stage entry of International Application No. PCT/EP2012/002820, with an international filing date of Jul. 7, 2012, which claims priority of France patent application Ser. No. 11/56149, filed Jul. 7, 2011, entitled "SHAPE MEMORY ALLOY ACTUATED PILOT CONTROLLED LATCHING VALVE".

TECHNICAL FIELD

The embodiments described below relate to, latching valves, and more particularly, to a latching valve controlled with shape memory alloy actuated pilot valves.

BACKGROUND OF THE INVENTION

Fluid handling devices are becoming increasingly popular and there is an increased demand for fluid handling devices. One type of fluid handling device is a latching valve. Latching valves may be electrically-actuated or fluid-actuated, for example. Latching valves have a unique feature that allows the valve to remain in an opened and/or a closed state without requiring a continuous supply of power to the valve. For example, in electrically-actuated latching valves a solenoid may be provided and energizing the solenoid can actuate the valve. Often, a permanent magnet may be provided to latch or otherwise retain the valve in the actuated position absent energy being supplied to the solenoid. Although this system works adequately at first, the magnet is typically exposed to the fluid and thus, can easily corrode, thereby rendering the valve inoperable.

Another type of electrically-actuated latching valve is shown in U.S. Pat. No. 6,742,761, which is directed towards a shape memory alloy-actuated valve with a latching feature. Two actuating mechanisms consisting of shape memory alloy wires are used to actuate a plunger between an open and close state. A conical spring is used to hold the plunger in the actuated state in the absence of a biasing force by the shape memory alloy wires. Therefore, the '761 patent describes a shape memory alloy-actuated valve that includes a latching feature; however, the '761 valve requires an extra latching component, namely the conical spring to perform the latching feature. Therefore, although the valve shown in the '761 patent eliminates the problem associated with corroding magnets discussed above, the '761 patent requires an excessive number of parts that can be costly during manufacturing. Further, the conical spring is prone to damage during repeated actuations.

The above-mentioned approaches discuss electrically-actuated latching valves. Another type of latching valve comprises a fluid-actuated latching valve that uses one or more pilot valves. Fluid-actuated latching valves may be desirable in situations where the pressure and/or flow rate of the fluid would require an excessive amount of power if controlled directly. Although fluid-actuated latching valves are known, they typically rely upon solenoid controlled pilot valves, which as discussed above fail in some respects due to the power consumption required. Furthermore, in some situations, the electromagnetic field generated by the solenoid valve can present problems in certain environments. Additionally, solenoid valves often create an audible clicking noise as they are actuated that may be undesirable in certain situations. Further, pilot actuated valves typically require a separate pressurized fluid source, which can add to the complexity of the system.

Therefore, there exists a need in the art for a latching valve that can be fluid-actuated and use a minimum amount of power as it is actuated between positions. The embodiments described below overcome these and other problems and an advance in the art is achieved. The embodiments described below provide a latching valve including pilot valves that are actuated using a shape memory alloy.

SUMMARY OF THE INVENTION

A latching valve is provided according to an embodiment. The latching valve comprises a valve seal movable between a first position and a second position to selectively open a fluid communication path between a fluid inlet port and a fluid outlet port. According to an embodiment, the latching valve further comprises a first pilot valve seal movable between a first position and a second position to selectively provide a pressurized fluid to a pilot control chamber, wherein pressurized fluid within the pilot control chamber biases the valve seal towards the first position. According to an embodiment, the latching valve further comprises a second pilot valve seal movable between a first position and a second position to selectively exhaust the pressurized fluid in the pilot control chamber. One or more shape memory alloy elements are provided to actuate one or more of the first and second pilot valve seals between the first and second positions upon heating above a transformation temperature.

A method for latching a valve is provided according to an embodiment. According to an embodiment, the latching valve includes a valve seal movable between a first position and a second position to control a flow of pressurized fluid from an inlet port to an outlet port. According to an embodiment, the method comprises a step of heating a first shape memory alloy element above a transformation temperature. According to an embodiment, the method further comprises a step of actuating a first pilot valve seal from a first position to a second position using the shape memory alloy element to provide a pressurized fluid to a pilot control chamber. According to an embodiment, the method further comprises a step of biasing the valve seal towards the first position with the pressurized fluid in the pilot control chamber. According to an embodiment, the method further comprises a step of cooling the first shape memory alloy element to below the transformation temperature to actuate the first pilot valve seal from the second position to the first position to close off the pilot control chamber, thereby maintaining the valve seal in the first position.

Aspects

According to an aspect, a latching valve comprises:
  a valve seal movable between a first position and a second position to selectively open a fluid communication path between a fluid inlet port and a fluid outlet port;
  a first pilot valve seal movable between a first position and a second position to selectively provide a pressurized fluid to a pilot control chamber, wherein pressurized fluid within the pilot control chamber biases the valve seal towards the first position;
  a second pilot valve seal movable between a first position and a second position to selectively exhaust the pressurized fluid in the pilot control chamber; and one or more shape memory alloy elements to actuate one or more of the first and second pilot valve seals between the first and second positions upon heating above a transformation temperature.

Preferably, the latching valve further comprises a resilient member coupled to the first and second pilot valve seals.

Preferably, the resilient member biases the first and second pilot valve seals towards the first position and partially deforms to actuate the first and second pilot valve seals to their second positions when the one or more shape memory alloy elements are above the transformation temperature.

Preferably, the latching valve further comprises an upper pilot seal and a lower pilot seal, wherein the resilient member is positioned between the upper and lower pilot seals.

Preferably, the first pilot valve seal is located within a first pilot chamber and the second pilot valve seal is located within a second pilot chamber and wherein the upper and lower pilot seals provides a substantially fluid tight seal between the first and second pilot chambers.

Preferably, the latching valve further comprises two or more electrical contacts contacting the one or more shape memory alloy elements.

Preferably, a first shape memory alloy element extends between a first electrical contact and a common electrical contact.

Preferably, a second shape memory alloy element extends between a second electrical contact and a common electrical contact.

According to an aspect, a method for latching a valve including a valve seal movable between a first position and a second position to control a flow of pressurized fluid from an inlet port to an outlet port comprises steps of
heating a first shape memory alloy element above a transformation temperature;
actuating a first pilot valve seal from a first position to a second position using the shape memory alloy element to provide a pressurized fluid to a pilot control chamber;
biasing the valve seal towards the first position with the pressurized fluid in the pilot control chamber; and
cooling the first shape memory alloy element to below the transformation temperature to actuate the first pilot valve seal from the second position to the first position to close off the pilot control chamber, thereby maintaining the valve seal in the first position.

Preferably, the method further comprises steps of:
heating a second shape memory alloy element above a transformation temperature;
actuating a second pilot valve seal from a first position to a second position using the second shape memory alloy element to at least partially exhaust the pressurized fluid from the pilot control chamber;
biasing the valve seal towards the second position with the pressurized fluid at the inlet port; and
cooling the second shape memory alloy element to below the transformation temperature to actuate the second pilot valve seal from the second position to the first position to close off the pilot control chamber, thereby latching the valve seal in the second position.

Preferably, the step of heating the first shape memory alloy element above the transformation temperature comprises thermoelectrically heating by applying a differential voltage between at least two electrical contacts in contact with the first shape memory alloy element.

Preferably, the step of cooling the first shape memory alloy element to below the transformation temperature comprises removing the differential voltage.

Preferably, the step of actuating the first pilot valve seal comprises partially deforming a resilient member using the first shape memory alloy element to raise the first pilot valve seal away from a first pilot valve seat.

Preferably, the pressurized fluid provided to the pilot control chamber through the first pilot valve seal is supplied from the inlet port.

DETAILED DESCRIPTION OF THE INVENTION

Figure 1:
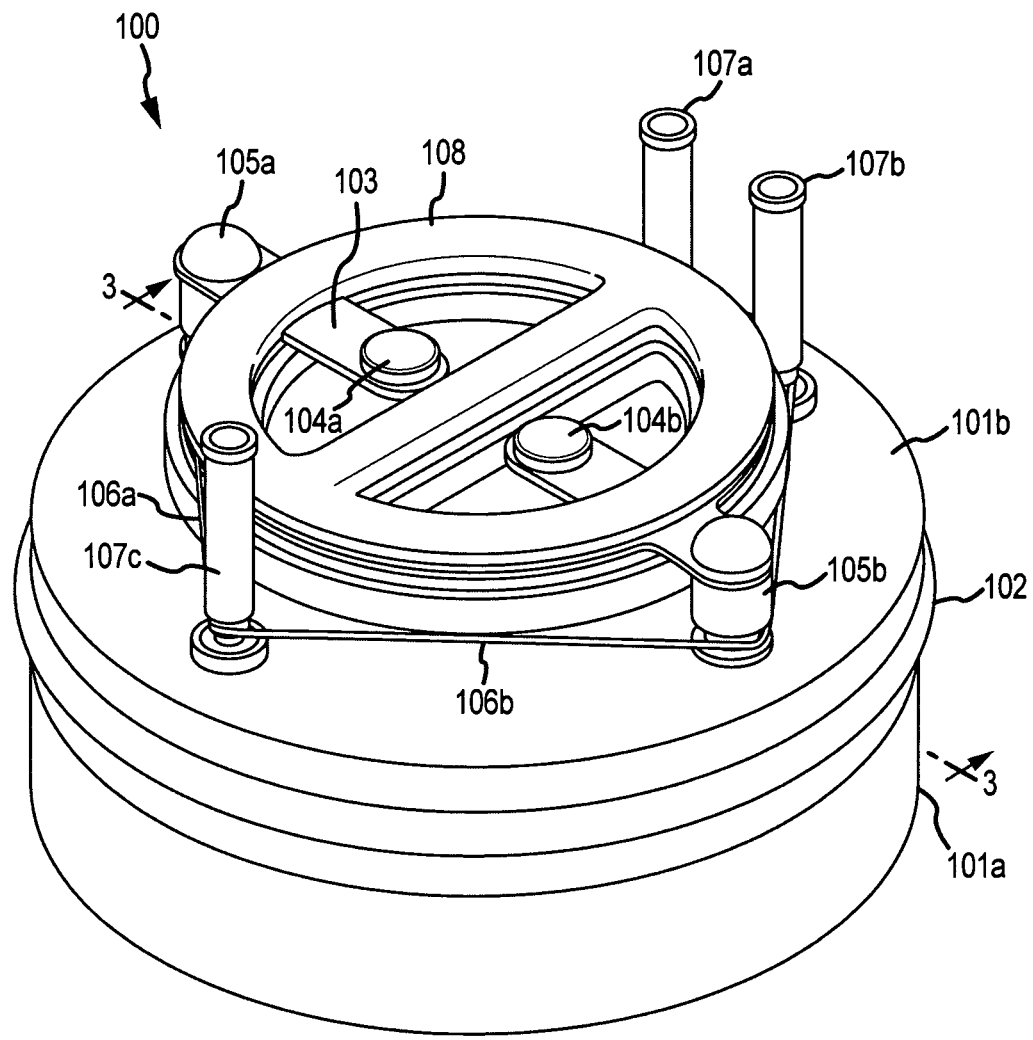
FIG. 1 shows a latching valve according to an embodiment.
Figure 2:
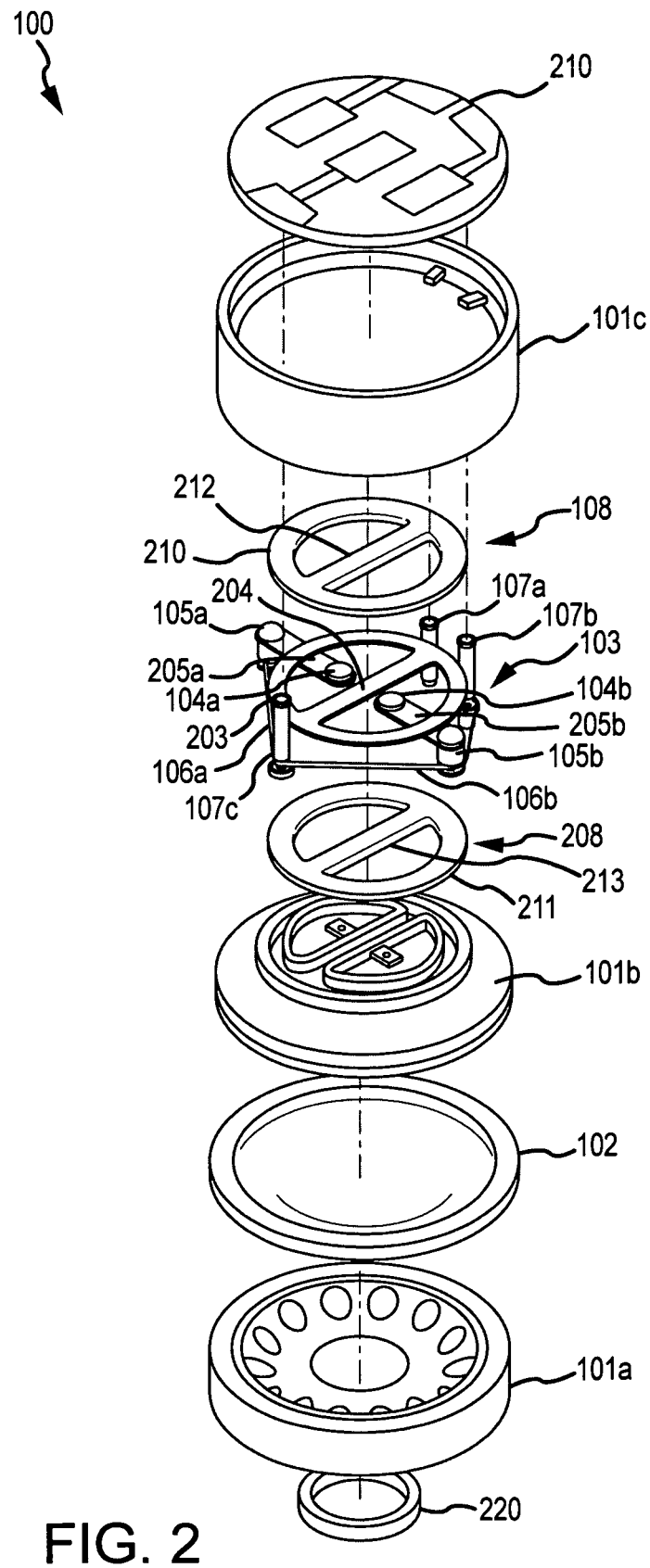
FIG. 2 shows an exploded view of the latching valve according to an embodiment.
Figure 3:
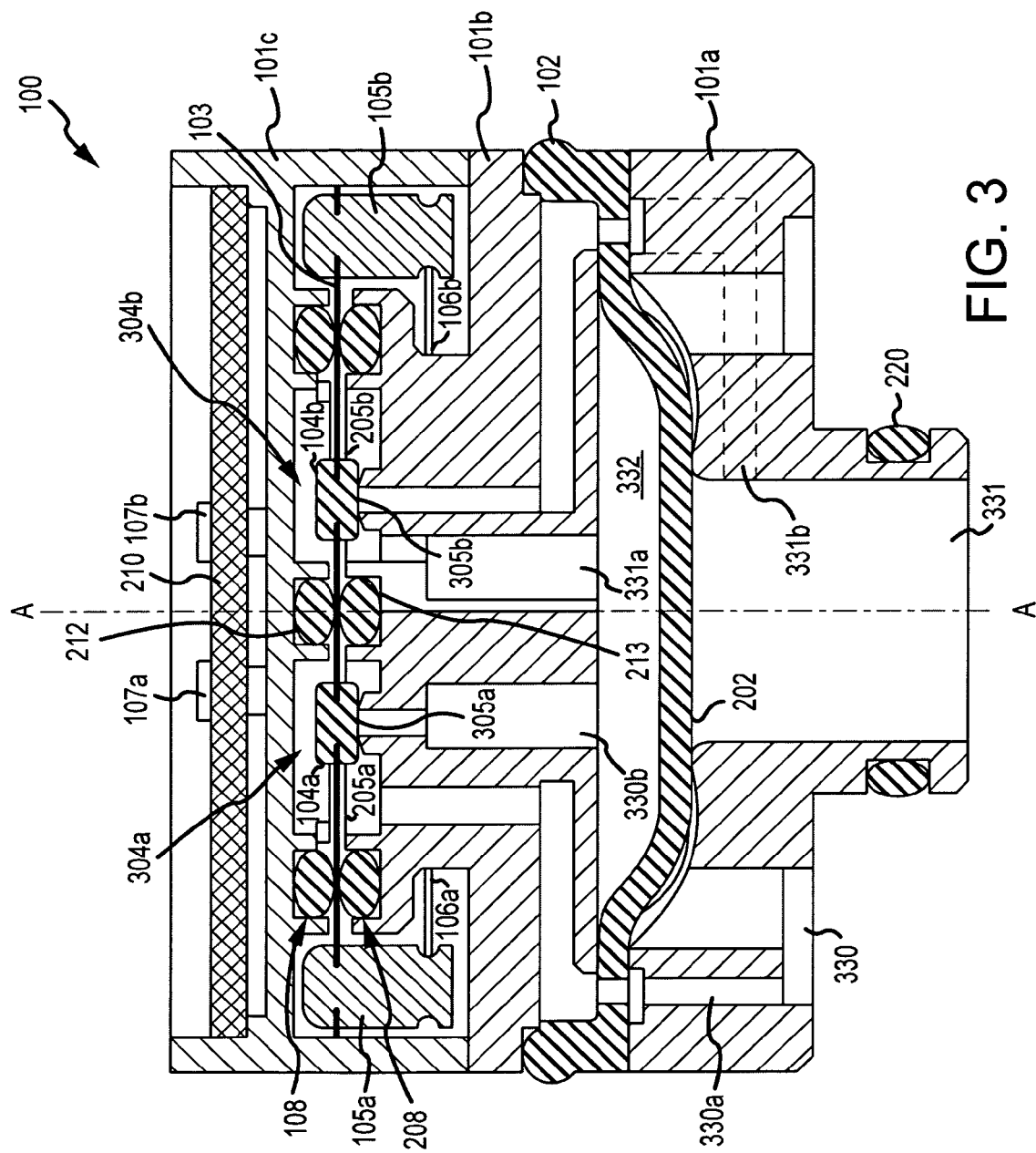
FIG. 3 shows a cross-sectional view of the latching valve according to an embodiment.

FIGS. 1-3 and the following description depict specific examples to teach those skilled in the art how to make and use the best mode of embodiments of a pilot actuated latching valve. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the latching valve. As a result, the embodiments described below are not limited to the specific examples described below, but only by the claims and their equivalents.

FIG. 1 shows a partially assembled latching valve 100 according to an embodiment. The latching valve 100 shown in FIG. 1 is only partially assembled in order to show some of the interior components that are otherwise not visible when the latching valve 100 is fully assembled. Additional components are shown in the exploded view of the latching valve 100 shown in FIG. 2 and the cross-sectional view of the latching valve 100 shown in FIG. 3. In the embodiment shown in FIG. 1, the latching valve 100 comprises a first housing portion 101a, a valve seal 102 (also considered the main valve seal) in the form of a diaphragm, a second housing portion 101b, a resilient member 103, first and second pilot valve seals 104a, 104b, first and second biasing members 105a, 105b, first and second shape memory alloy (SMA) elements 106a, 106b, electrical contacts 107a, 107b, 107c, and an upper pilot seal 108.

According to an embodiment, the valve seal 102 can be held in place by the first and second housing portions 101a, 101b. For example, the valve seal 102 can be clamped between the first and second housing portions 101a, 101b. Alternatively, the valve seal 102 can be coupled to each of the housing portions 101a, 101b using some other method of creating fluid-tight couplings, such as adhesives, bonding, etc. The particular method used for coupling the valve seal 102 to the housing portions 101a, 101b should in no way limit the scope of the present embodiment. However, in preferred embodiments, the valve seal 102 forms a substantially fluid-tight seal with both the first and second housing portions 101a, 101b.

Also shown in FIG. 1 is the resilient member 103, which controls actuation of the pilot valve seals 104a, 104b. As discussed in more detail below, the pilot valve seals 104a, 104b can be actuated to control a pilot fluid used to control the valve seal 102. The resilient member 103 may comprise a wide variety of materials capable of partially deforming when a predetermined force is applied and then returning to the original shape once the force is removed. In one embodiment, the resilient member 103 comprises a stainless steel plate, for example. However, those skilled in the art will readily recognize alternative materials. As shown, the pilot valve seals 104a, 104b are coupled to the resilient member 103.

Also coupled to the resilient member 103 are first and second biasing members 105a, 105b. The biasing members 105a, 105b can be used to bias the resilient member 103 to actuate the pilot valve seals 104a, 104b. The shape and size of the resilient member 103 can be chosen so lateral movement of the biasing members 105a, 105b results in a desired axial movement of the pilot valve seals 104a, 104b, as discussed in greater detail below.

According to an embodiment, the SMA elements 106a, 106b can provide the biasing force on the biasing members 105a, 105b as discussed in more detail below. As shown, the SMA elements 106a, 106b contact the biasing members 105a, 105b at a position on the SMA elements 106a, 106b between two electrical contacts. For example, the first SMA element 106a contacts the first biasing member 105a between the first electrical contact 107a and the common electrical contact 107c. Similarly, the second SMA element 106b contacts the second biasing member 105b between the second electrical contact 107b and the common electrical contact 107c. The SMA elements 106a, 106b may be coupled to the biasing members 105a, 105b or may simply contact the biasing members 105a, 105b.

In alternative embodiments, the valve seals 104a, 104b may be coupled directly to the SMA elements 106a, 106b without the use of the resilient member 103 and the biasing members 105a, 105b. For example, the valve seals 104a, 104b may comprise plunger type valves with the SMA elements 106a, 106b connected directly to the plunger. Therefore, the present embodiment should not be limited to the resilient member 103 and the biasing members 105a, 105b. According to another embodiment, a single SMA element may be provided to actuate one of the first and second pilot valve seals 104a, 104b while another method is used to actuate the other pilot valve seal. For example, the SMA element 106a may be provided to actuate the first pilot valve seal 104a while the second pilot valve seal 104b is actuated manually.

According to the embodiment shown, the SMA elements 106a, 106b are coupled to two electrical contacts 107a, 107c and 107b, 107c, respectively. However, in other embodiments, the SMA elements 106a, 106b may be coupled to more than two electrical contacts. Similarly, while the present embodiment utilizes a common electrical contact 107c, it should be appreciated that in other embodiments, each SMA element 106a, 106b may be coupled to two separate electrical contacts, i.e., there may be no common electrical contact. However, the use of a common electrical contact 107c can reduce the number of components required to form the valve 100 and thus, may reduce the costs associated with the valve 100.

According to the embodiment shown, the electrical contacts 107a-107c are shown coupled to the second housing portion 101b. However, it should be appreciated that in other embodiments, the electrical contacts 107a-107c may be coupled to other housing portions and the embodiments should not be limited to the specific situation shown in the figures.

FIG. 2 shows an exploded view of the latching valve 100 according to an embodiment. In addition to the components shown in FIG. 1, FIG. 2 also shows a lower pilot seal 208, a third housing portion 101c, and a printed circuit board (PCB) 210. The PCB 210 may be provided to selectively energize the electrical contacts 107a-107c. The PCB 210 may be in electrical communication with a user interface, processing system, or the like that can provide appropriate signals indicating which pilot valve seals 104a, 104b need to be actuated.

As can be appreciated from FIG. 2, the resilient member 103 can be positioned between the upper and lower pilot seals 108, 208. In some embodiments, the upper and lower pilot seals 108, 208 can help control what portions of the resilient member 103 move during actuation of the pilot valve seals 104a, 104b. For example, the resilient member 103 is shown as comprising a substantially circular portion 203 with a center support 204 and two pilot tabs 205a, 205b. Likewise, the upper and lower pilot seals 108, 208 comprise substantially circular portions 210, 211 and center supports 212, 213 that substantially match the shape and size of the circular portion 203 and center support 204 of the resilient member 103. Consequently, when the resilient member 103 is positioned between the upper and lower pilot seals 108, 208, the pilot tabs 205a, 205b are free to move while the remainder of the resilient member 103 is substantially restricted from movement. This restricted movement is discussed in greater detail in the discussion accompanying FIG. 3.

Additionally shown in FIG. 2 is a valve coupling seal 220. As can be appreciated, the latching valve 100 can be coupled to various devices. The valve coupling seal 220 can form a substantially fluid-tight seal with the device or a fluid conduit, hose, etc. used to deliver pressurized fluid from the valve 100 to the device.

FIG. 3 shows a cross-sectional view of the latching valve 100 according to an embodiment. According to the embodiment shown in FIG. 3, the latching valve 100 comprises a first fluid port 330 and a second fluid port 331. According to an embodiment, the first fluid port 330 may comprise a fluid inlet while the second fluid port 331 comprises a fluid outlet. It should be appreciated however, that the flow through the latching valve 100 could be reversed and the discussion below refers to inlet and outlet merely to aid in an understanding of the drawing. As can be seen, the valve seal 102 can selectively contact a valve seat 202 formed in the first housing portion 101a in order to selectively seal the inlet port 330 off from the outlet port 331. It should be appreciated, that while FIG. 3 shows the valve seat 202 comprising a portion of the first housing portion 101a, in other embodiments, the valve seat 202 may comprise a separate component that is coupled to the first housing portion 101a. For example, it may be desirable to provide a valve seat 202 having different physical characteristics from the first housing portion 101a. According to an embodiment, the first housing portion 101a may be formed from a plastic material, while a separate valve seat may be formed from rubber or some other partially deformable material. Therefore, while a separate valve seat 202 is not always necessary; a separate valve seat may be coupled to the first housing portion 101a according to known methods.

According to the embodiment shown, a first pilot supply channel 330a branches off from the inlet port 330. According to another embodiment, the first pilot supply channel 330a may comprise a separate fluid channel with its own pressurized fluid source. However, branching the first pilot supply channel 330a off from the inlet port 330 eliminates the need for a separate pressurized fluid source. As shown, the first pilot supply channel 330a extends through the valve seal 102 towards a first pilot chamber 304a. As can be seen, the first pilot valve seal 104a is located within the first pilot chamber 304a. The first pilot valve seal 104a is movable between a first position (shown) and a second position. In the first position, the first pilot valve seal 104a forms a substantially fluid-tight seal with a first pilot valve seat 305a. In the second position, the first pilot valve seal 104a moves away from the first pilot valve seat 305a in order to open a fluid communication path between the first pilot supply channel 330a and a first pilot outlet channel 330b. The first pilot outlet channel 330b is in fluid communication with a pilot control chamber 332. As can be seen, a first side of the valve seal 102 is exposed to the pilot control chamber 332. According to an embodiment, pressurized fluid within the pilot control chamber 332 acts on the valve seal 102 to bias the valve seal 102 towards a first position. In the embodiment shown, in the first position, the valve seal 102 is sealed against the valve seat 202.

According to an embodiment, a second pilot supply channel 331a is in fluid communication with the pilot control chamber 332. The second pilot supply channel 331a provides a fluid communication path between the pilot control chamber 332 and a second pilot chamber 304b. As shown, the second pilot valve seal 104b is located within the second pilot chamber 304b. The second pilot valve seal 104b is movable between a first position (shown) and a second position. In the first position, the second pilot valve seal 104b forms a substantially fluid-tight seal with a second pilot valve seat 305b. In the second position, the second pilot valve seal 104b moves away from the second pilot valve seat 305b in order to open a fluid communication path between the second pilot supply channel 331a and a second pilot outlet channel 331b. As can be seen, the second pilot outlet channel 331b provides a fluid communication path between the second pilot chamber 304b and the fluid outlet 331. A portion of the second pilot outlet channel 331b is shown in dashed lines because it is located beyond where the cross-sectional view is taken from. As can be seen, the second pilot outlet channel 331b extends through a portion of the valve seal 102.

In use, the first and second pilot valve seals 104a, 104b can be selectively actuated in order to open and close the valve seal 202. According to an embodiment, actuation of the first and second pilot valve seals 104a, 104b can be performed using the first and second SMA elements 106a, 106b. The first and second SMA elements 106a, 106b may actuate the corresponding pilot valve seal 104a, 104b upon heating to above a transformation temperature. According to the embodiment shown, the SMA elements 106a, 106b can be heated via thermoelectrically heating by energizing the electrical contacts 107a-107c. Thermoelectrically heating the SMA elements 106a, 106b can be performed by applying differential voltage between two or more electrical contacts. According to an embodiment, one of the electrical contacts can be at ground or at a negative voltage, for example. For example, according to an embodiment, to heat the first SMA element 106a, a differential voltage can be applied between the first electrical contact 107a and the common electrical contact 107c. Similarly, the second SMA element 106b can be heated by applying a differential voltage between the second electrical contact 107b and the common electrical contact 107c. It should be appreciated that while the SMA elements 106a, 106b are described as comprising separate components, in some embodiments, a single SMA element may extend around the valve and contact each of the electrical contacts 107a-107c in order to create independent portions that can be heated independently in the manner described above. Furthermore, while the discussion refers to thermoelectrically heating the SMA elements 106a, 106b, in other embodiments, the SMA elements 106a, 106b may be heated using other methods, such as a separate heating element (not shown).

Shape memory alloys are metals that are generally known for their physical transformation above a transformation temperature. By combining the appropriate alloys, the transformation temperature of the SMA elements 106a, 106b can be determined. The transformation temperature is generally understood as the temperature at which the SMA material starts to transform from a martensite crystal structure to an austenite crystal structure. When the SMA elements 106a, 106b are below the transformation temperature, the metal remains in the martensite crystal structure. In the martensite crystal structure, the metal can be physically deformed into a first size and/or shape and can remain in that shape while below the transformation temperature. According to an embodiment, the physical deformation comprises stretching of the SMA elements 106a, 106b using the biasing members 105a, 105b and the resilient member 103.

Upon heating the SMA elements 106a, 106b to above the transformation temperature, the SMA elements 106a, 106b begin to transform into the austenite crystal structure where the alloy returns to its "memorized", pre-deformed, size and/or shape. The transformation that occurs in SMA materials is relatively fast as no diffusion occurs as in many types of phase changes. This unique property of SMA materials can be utilized in the latching valve 100 in order to selectively open or close the pilot valve seals 104a, 104b.

According to an embodiment, a pressurized fluid can be supplied to the inlet port 330 of the latching valve 100. A separate fluid coupling (not shown) can be provided to supply the pressurized fluid. The pressurized fluid may comprise a liquid or a gas, for example. As can be appreciated, with pressurized fluid being supplied to the inlet port 330, the valve seal 102 will move away from the valve seat 202 due to the pressure of the fluid acting on the valve seal 102. Consequently, the pressurized fluid will be able to flow from the inlet port 330 to the outlet port 331.

In order to return the valve seal 102 back towards the valve seat 202, i.e., close the valve 100, the first pilot valve seal 104a can be actuated. In order to actuate the first pilot valve seal 104a, the first SMA element 106a can be thermoelectrically heated by applying a differential voltage between the first electrical contact 107a and the common electrical contact 107c. The applied voltage thermoelectrically heats the SMA element 106a to above the transformation temperature of the SMA element 106a. As the SMA element 106a is heated to above the transformation temperature, the SMA element 106a returns to its memorized size and overcomes the stretching force provided by the biasing member 105 and the resilient member 103. As the size of the SMA element 106a decreases, the biasing member 105a is pulled inward approximately perpendicular to the valve's longitudinal axis A-A. This inward movement of the biasing member 105a causes at least a portion of the resilient member 103 to partially deform. However, the majority of the resilient member 103 is positioned between the upper and lower pilot seals 108, 208. Therefore, substantially all of the movement of the resilient member 103 is realized in the first pilot tab 205a, which moves upwards approximately parallel to the longitudinal axis A-A as shown in the drawings, causing the pilot valve seal 104a to move away from the pilot valve seat 305a. The pilot tab 205a moves upward due to the pivot point that is created by the upper and lower pilot seals 108, 208.

As the pilot valve seal 104a moves away from the pilot valve seat 305a, pressurized fluid in the first pilot supply channel 330a is brought into fluid communication with the pilot control chamber 332. The fluid is substantially isolated from the second pilot chamber 304b by the upper and lower center supports 212, 213. As can be seen, with the fluid acting on the bottom of the valve seal 102 to bias the valve seal 102 towards the second position and exhausting the valve through the outlet port 331, the pressurized fluid in the valve chamber 332 acting on the top of the valve seal 102 biasing the valve seal 102 towards the first position provides a greater biasing force. Consequently, with the pressurized fluid supplied to the pilot control chamber 332, the valve seal 102 is moved to the first position to once again form a substantially fluid tight seal with the valve seat 202.

As can be appreciated, with the valve seal 102 closed, and the fluid pressure at the inlet port 330 and the pilot outlet channel 330b being substantially equal, the valve seal 102 is maintained in the first position. This is because although the fluid pressure is substantially equal, the pressure of the fluid in the pilot control chamber 332 acts on a substantially larger area of the valve seal 102 than the area of the valve seal 102 acted upon by fluid in the inlet port 330. When the valve seal 102 is in the first position, the fluid in the inlet port 330 only acts on the area of the valve seal 102 that is outside of the valve seat 202. In contrast, the fluid in the pilot control chamber 332 acts on substantially the entire portion of the valve seal 102 that is inside the housing 101a, 101b. Therefore, while the fluid pressure is substantially the same, the biasing force provided by the fluid in the pilot control chamber 332 is substantially greater than the biasing force provided by the fluid in the inlet port 330.

Therefore, once the valve seal 102 moves back to the first position, the differential voltage applied between the first electrical contact 107a and the common electrical contact 107c can be removed. According to an embodiment, once the differential voltage is removed, the temperature of the first SMA element 106a falls below the transformation temperature and the resilient member 103 and biasing member 105a can once again stretch the first SMA element 106a and the pilot valve seal 104a can return to forming a substantially fluid tight seal with the pilot valve seat 305a. As long as the pressure supplied to the inlet port 330 does not change by more than a threshold amount, the valve seal 102 will remain in the first position, i.e., the valve seal 102 is latched closed. Therefore, the valve seal 102 can remain closed in the absence of electrical energy provided to the valve 100.

According to an embodiment, in order to move the valve seal 102 towards the second position, away from the valve seat 202, the second pilot valve seal 104b can be actuated. Actuation of the second valve seal 104b can be performed in a similar manner as actuation of the first pilot valve seal 104a. According to an embodiment, a differential voltage can be applied between the second electrical contact 107b and the common electrical contact 107c in order to thermoelectrically heat the second SMA element 106b. Upon heating the second SMA element 106b above the transformation temperature, the second SMA element 106b returns to its memorized size. As the SMA element 106b returns to its memorized size, the SMA element 106b overcomes the force applied by the resilient member 103 and the biasing member 105b. As the SMA element 106b reduces in length, the SMA element 106b applies a force on the second biasing member 105b approximately perpendicular to the longitudinal axis A-A to deform the resilient member 103. As discussed above, a substantial portion of the resilient member 103 is positioned between the upper and lower pilot seals 108, 208. Consequently, when the biasing member 105b is moved inward as shown in the drawings, the second pilot tab 205b is moved upward approximately parallel to the longitudinal axis A-A due to the pivot point created by the upper and lower pilot seals 108, 208.

According to an embodiment, as the second pilot tab 205b moves upward, the second pilot valve seal 104b is moved within the second pilot chamber 304b away from the second pilot valve seat 305b. This opens a fluid communication path between the pilot control chamber 332 and the outlet port 331 via the second pilot supply and outlet channels 331a, 331b.

The fluid within the pilot control chamber 332 can therefore be at least partially exhausted, thereby relieving the pressure biasing the valve seal 102 towards the first position. It should be appreciated that some fluid may be left within the pilot control chamber 332. However, as long as the pressure within the pilot control chamber 332 falls below a threshold level, the pressure of the fluid in the input port 330 can bias the valve seal 102 away from the valve seat 202 to once again open the latching valve 100. With the pressure in the pilot control chamber 332 exhausted, the differential voltage applied between the second electrical contact 107b and the common electrical contact 107c can be removed and the temperature of the second SMA element 106b can fall below the transformation temperature, thereby closing the second pilot valve seal 104a against the second pilot valve seat 305b. As can be appreciated, the valve seal 102 remains in the second position due to the pressurized fluid supplied to the input port 330 without requiring power supplied to the latching valve 100.

Therefore, the latching valve 100 can be latched opened or closed and only requires power to be supplied to the latching valve 100 when changing states. Furthermore, the latching valve 100 of the present embodiment does not require an additional component, such as a conical spring, to latch the valve as required in the prior art. Rather, latching of the valve 100 in the opened or closed positions can be accomplished using the pressurized fluid that is controlled by the valve 100. Furthermore, as described above, the latching valve 100 of the present embodiment does not require a separate pilot fluid. Rather, the pilot fluid used to control actuation of the valve seal 102 can be the same fluid that is controlled by the valve 100.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments of, and examples for, the latching valve are described herein for illustrative purposes, various equivalent modifications are possible within the scope of the present description, as those skilled in the relevant art will recognize. The teachings provided herein can be applied to other valves, and not just to the embodiments described above and shown in the accompanying figures. Accordingly, the scope of the embodiments should be determined from the following claims.

We claim:

1. A latching valve (100), comprising:
a valve seal (102) movable between a first position and a second position to selectively open a fluid communication path between a fluid inlet port (330) and a fluid outlet port (331);
a first pilot valve seal (104a) movable between a first position and a second position to selectively provide a pressurized fluid to a pilot control chamber (332), wherein pressurized fluid within the pilot control chamber (332) biases the valve seal (102) towards the first position;
a second pilot valve seal (104b) movable between a first position and a second position to selectively exhaust the pressurized fluid in the pilot control chamber (332);

a resilient member (103) coupled to the first and second pilot valve seals (104a, 104b); and one or more shape memory alloy elements (106a, 106b) to actuate one or more of the first and second pilot valve seals (104a, 104b) between the first and second positions upon heating above a transformation temperature.

2. The latching valve (100) of claim 1, wherein the resilient member (103) biases the first and second pilot valve seals (104a, 104b) towards the first position and partially deforms to actuate the first and second pilot valve seals (104a, 104b) to their second positions when the one or more shape memory alloy elements (106a, 106b) are above the transformation temperature.

3. The latching valve of claim 1, further comprising an upper pilot seal (108) and a lower pilot seal (208), wherein the resilient member (103) is positioned between the upper and lower pilot seals (108, 208).

4. The latching valve of claim 3, wherein the first pilot valve seal (104a) is located within a first pilot chamber (304a) and the second pilot valve seal (104b) is located within a second pilot chamber (304b) and wherein the upper and lower pilot seals (108, 208) provides a substantially fluid tight seal between the first and second pilot chambers (304a, 304b).

5. The latching valve (100) of claim 1, further comprising two or more electrical contacts (107a-107c) contacting the one or more shape memory alloy elements (106a, 106b).

6. The latching valve (100) of claim 5, wherein a first shape memory alloy element (106a) extends between a first electrical contact (107a) and a common electrical contact (107c).

7. The latching valve (100) of claim 5, wherein a second shape memory alloy element (106b) extends between a second electrical contact (107b) and a common electrical contact (107c).

8. A method for latching a valve including a valve seal movable between a first position and a second position to control a flow of pressurized fluid from an inlet port to an outlet port, comprising steps of:

heating a first shape memory alloy element above a transformation temperature;

actuating a first pilot valve seal from a first position to a second position using the shape memory alloy element to provide a pressurized fluid to a pilot control chamber;

biasing the valve seal towards the first position with the pressurized fluid in the pilot control chamber;

cooling the first shape memory alloy element to below the transformation temperature to actuate the first pilot valve seal from the second position to the first position to close off the pilot control chamber, thereby maintaining the valve seal in the first position; wherein maintaining the valve seal in both the first position and the second position does not require constant power;

heating a second shape memory alloy element above a transformation temperature; and actuating a second pilot valve seal from a first position to a second position using the second shape memory alloy element to at least partially exhaust the pressurized fluid from the pilot control chamber;

coupling a resilient member to the first and second pilot valve seals.

9. The method of claim 8, further comprising steps of:

biasing the valve seal towards the second position with the pressurized fluid at the inlet port; and cooling the second shape memory alloy element to below the transformation temperature to actuate the second pilot valve seal from the second position to the first position to close off the pilot control chamber, thereby latching the valve seal in the second position.

10. The method of claim 8, wherein the step of heating the first shape memory alloy element above the transformation temperature comprises thermoelectrically heating by applying a differential voltage between at least two electrical contacts in contact with the first shape memory alloy element.

11. The method of claim 10, wherein the step of cooling the first shape memory alloy element to below the transformation temperature comprises removing the differential voltage.

12. The method of claim 8, wherein the step of actuating the first pilot valve seal comprises partially deforming a resilient member using the first shape memory alloy element to raise the first pilot valve seal away from a first pilot valve seat.

13. The method of claim 8, wherein the pressurized fluid provided to the pilot control chamber through the first pilot valve seal is supplied from the inlet port.

* * * * *